United States Patent [19]

Floyd et al.

[11] Patent Number: 4,639,609
[45] Date of Patent: Jan. 27, 1987

[54] LOAD CURRENT MANAGEMENT SYSTEM FOR AUTOMOTIVE VEHICLES

[75] Inventors: William M. Floyd, Livonia; David L. Juzswik, Dearborn Heights, both of Mich.

[73] Assignee: United Technologies Automotive, Inc., Dearborn, Mich.

[21] Appl. No.: 705,480

[22] Filed: Feb. 26, 1985

[51] Int. Cl.$^4$ ............................................. B62G 45/00
[52] U.S. Cl. .................................... 307/10 R; 307/38; 307/39; 307/40
[58] Field of Search ................... 307/10 R, 11, 12, 38, 307/39, 40, 41, 35

[56] References Cited

U.S. PATENT DOCUMENTS

| | | | |
|---|---|---|---|
| 3,714,453 | 1/1973 | Delisle et al. | 307/41 X |
| 4,310,770 | 1/1982 | Keener et al. | 307/35 |
| 4,321,477 | 3/1982 | Bartlett | 307/39 X |
| 4,336,462 | 6/1982 | Hedges et al. | 307/38 X |
| 4,499,385 | 2/1985 | Slavik | 307/39 X |

Primary Examiner—William M. Shoop, Jr.
Assistant Examiner—Alfred F. Hoyte
Attorney, Agent, or Firm—Stephen A. Schneeberger

[57] ABSTRACT

An electrical power delivery system and method of operation particularly suitable for use in a vehicle is disclosed. A single wire power conductor is connected through remote power switches to a plurality of loads. The power conductor is sized such that its current-carrying capacity is less than the current required to simultaneously operate all the loads connected thereto. Logic means are provided for delivering a control signal to the remote power switches to selectively energize the appropriate loads. The logic means additionally includes means responding to excess current flow through the power conductor to schedule the control signals to prevent simultaneous operation of all the loads thereby limiting current flow through the power conductor to its current-carrying capacity.

19 Claims, 4 Drawing Figures

LOAD CURRENT MANAGEMENT SYSTEM FOR AUTOMOTIVE VEHICLES

DESCRIPTION

1. Technical Field

The present invention relates to electrical power delivery and more particularly to a system for the delivery of electrical power to various loads in a vehicle, such as an automotive vehicle.

2. Background Art

Efforts are being made to reduce the wiring harness requirements associated with the delivery of electrical power and the control of various electrical loads in automobiles and similar vehicles. One technique receiving considerable attention involves the use of multiplex wiring methods to reduce the bulk and routing complexities of traditional wiring harnesses. Recent examples of such multiplex systems are disclosed in U.S. Pat. No. 4,534,025 issued Aug. 6, 1985 to W. M. Floyd for "Vehicle Multiplex System Having Protocol/Format For Secure Communication Transaction" and U.S. Pat. No. 4,528,662 issued July 9, 1985 to W. M. Floyd et al for "Multiplex Control System Having Enhanced Integrity". Both of these applications are owned by the assignee of the present application. Such multiplex systems typically transform the vehicle electrical wiring system to an input/output system as a consequence of separating the power switching function from the logic switching function. The input system is concerned with the ergonomic aspects of the input switch design as well as the logical processing of the commands supplied by the vehicle's operator and/or passengers. The output system is concerned with directing power to the various loads and involves details such as distribution of the 12 volt power supply, remote switch electrical stresses and load device diagnostics.

Prior to the development of multiplex-wired vehicles, traditional power deliver systems had relied upon sizing the conductors sufficiently large to handle the total requirement of a plurality of loads all energized simultaneously. For instance, if a plurality of loads were connected to the end of a power conductor, it was necessary to establish the load current required by each load, the length of the conductor, the permissible IR drop at each load and then to select a wire gauge that would meet all of the requirements. Similarly, any switch connected to the power conductor for controlling delivery of current to the loads was designed to exceed the current-carrying capacity of the conductor connected to it.

DISCLOSURE OF INVENTION

In multiplex-wired vehicle systems, it is an objective that the overall volume and weight of conductor wires be reduced. Typically, the multiplex-wired vehicle employs single wire feeds to remote regions containing various functions. Due to the uncertainty of simultaneous load operation, it is difficult to predict the power feed wire size. Moreover, it is desirable to minimize the size or gauge of such power feed wire to the extent possible.

Accordingly, it is an object of the present invention to provide an electrical power delivery system for a vehicle, such as an automobile, which allows minimum gauge power conducting wire to be utilized.

It is a further object to provide such a power delivery system which is particularly suited for use in an output multiplex system.

It is yet a further object to provide such an electrical power delivery system having a plurality of loads of differing functions.

It is another object to provide a current monitoring system capable of separately monitoring an electrical operating condition of each load for diagnostic purposes.

In accordance with the present invention there is provided an improved electrical power delivery system for a vehicle, such as an automobile. The power delivery system is conveniently associated with a vehicle multiplex control system of the type employing a centralized multiplex control computer and one or more remote multiplex units (REMUX) each serving a particular region of the vehicle and responsible for controlling loads in that region. Within a particular region, the several controlled loads may typically provide different functions, as for instance, window actuation, door lock actuation, heat control and/or indicator lamp illumination. A power conductor extends from a power supply to respective power switches in the region, each switch being associated with a respective one of the loads in that region. Since multiple use of the various functions within a region rarely occurs simultaneously, the power conductor wire need not be sized so large as to accommodate the current occasioned by simultaneous operation of all of the loads. However, to accommodate those periods of simultaneous load demand within the region, provision is made for recognizing such intervals of excessive current demand and for establishing temporary load priority selection to maintain the current within a predetermined limit. The load priority selection may be varied so quickly that the operator of the vehicle does not realize the loads are being pulsed to limit current flow through the power conductor.

Specifically, a power conductor, as for instance a single wire, extends from a power supply to a region of the vehicle where current is selectively conducted through various loads via the controlled actuation of respective power switches in that region. Control of the respective power switches in a region and in turn connected via a data bus with a centralized multiplex control computer. The power conductor to the region is of a predetermined limited current-carrying capacity which is less than that required to simultaneously deliver full current to all of the loads in that region. Monitoring circuitry associated with the power conductor determines whether or not the current exceeds a threshold level and provides a signal indicative of such determination. That signal is monitored by the control circuitry of the REMUX and in turn by the control circuitry of the multiplex control computer. Once the current approaches or exceeds the threshold level the multiplex control computer acts to inhibit actuation of preselected loads of a lower priority in order to maintain the current through the power conductor below the predetermined threshold. Actuation of a particular load is typically controlled via an enabling signal applied to a power switch connected in series with the load and the power conductor. The various loads are prioritized based on a variety of factors such as current required, importance to operation of vehicle, and expected duration of operation of the load.

The multiplex control computer may also be used to identify the proposed current draw of each load or combination of loads being energized. This information may be utilized to select a current profile for that combination of loads such that the threshold level may be varied for each combination of loads. Additionally, by providing an adjustable threshold to a comparator serving as part of the current monitor, the adjustment of the current profile for the specific combination of loads is easily accomplished. This adjustable threshold may further be used to monitor on a selected basis the current flow to individual loads. The multiplex control computer may be utilized to selectively energize appropriate loads and to set the adjustable threshold for each load such that a sequential diagnostic evaluation may be performed on each load by comparing the current profile for the load with the current actually detected.

BEST MODE FOR CARRYING OUT THE INVENTION

Figure 1:
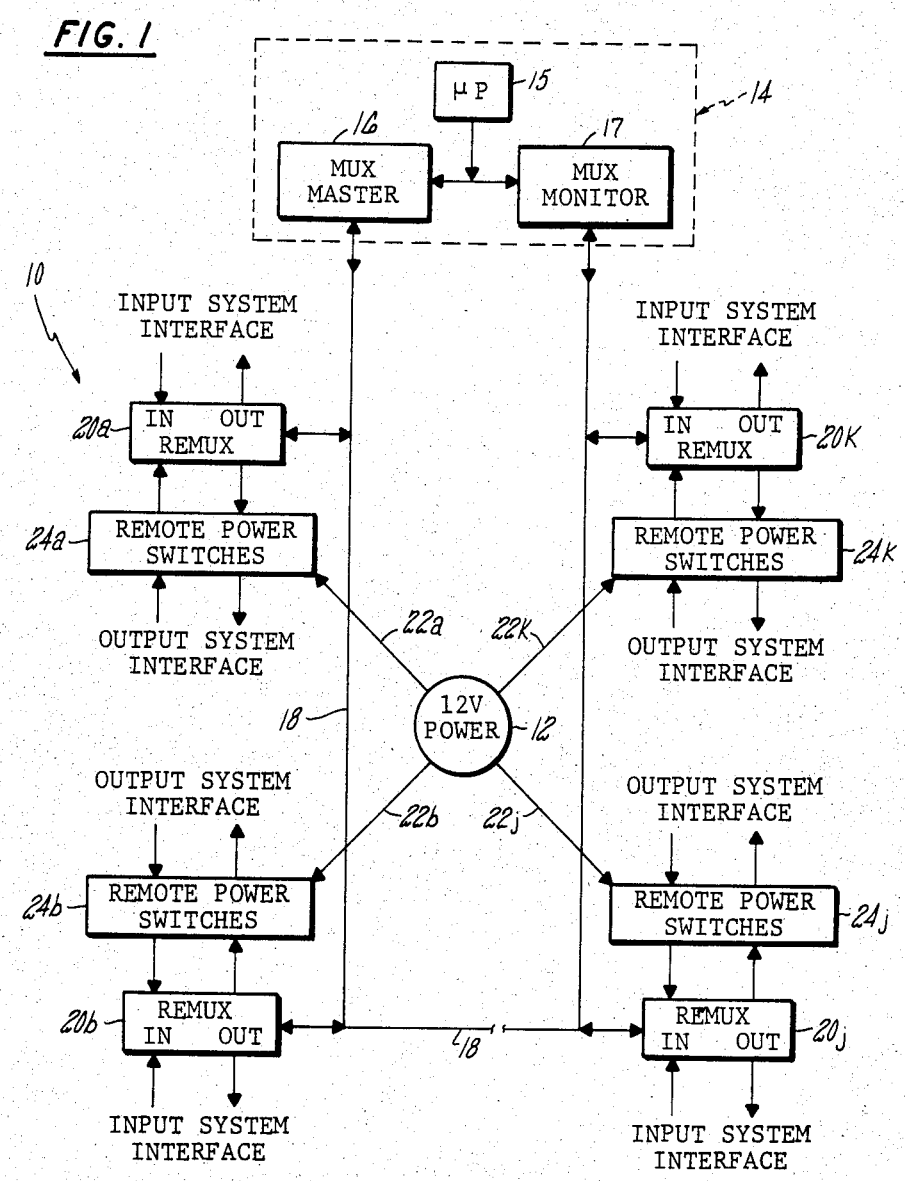
FIG. 1 is a generalized diagrammatic illustration of a multiplex system for controlling delivery of electrical power to various loads in various regions of an automotive vehicle.

Referring now to the drawings and particularly to FIG. 1, there is illustrated a generalized body electrical system for an automotive vehicle and utilizing a multiplex control system generally of the type disclosed in aforementioned U.S. application Ser. Nos. 469,591 and 540,581, which are incorporated herein by reference. A body electrical system, generally designated 10, includes various operator-actuated input switches and sensors for controlling the operation of various electrical loads. The loads may take a variety of forms including window lift motors, power door lock motors, seat-adjustment motors, interior lighting, exterior lighting, indication lamps, heater elements and the like. Electrical power to actuate the various loads is provided by a 12 volt DC power supply, such as battery 12. A central multiplex control computer 14 includes a microprocessor 15 and complementary-acting master multiplex circuitry 16 and monitor multiplex circuitry 17 for sending and receiving serially multiplexed data to various regions of an automobile via a data wire comprising one of the wires in a four-wire multiplex bus 18. Bus 18 includes a data line, a clock line, and two lines for delivering the supply potentials to the associated logic. The multiplex bus 18 extends to various regions of a vehicle and a respective remote multiplexer (REMUX) 20 is connected to bus 18 at each such region. For purposes of identification, the various regions have been identified by respective alphabetical subscripts to the reference numerals, i.e. $20_a$, $20_b$ ... $20_j$, $20_k$. Each region typically includes a plurality of inputs to the system from respective switches and outputs to various, typically diverse, loads.

A representative region might comprise the door of a two or four-door vehicle. It might include inputs from a coded vehicle entry switch as well as from a window control switch, a mirror heater switch and possibly a mirror control switch. The loads associated with that region might include a window actuation motor, a door lock actuator, illumination lamps, heaters and the like. The electrical energy for energizing the various loads at respective regions of the vehicle is distributed to that region by a "star" distribution arrangement in which a respective single wire conductor $22_a$, $22_b$ ... $22_j$, $22_k$ extends to each of the respective regions from the power source 12. The several power conductors $22_a$–$22_k$ extend to respective groups of remote power switches $24_a$–$24_k$ at the respective regions.

Figure 2:
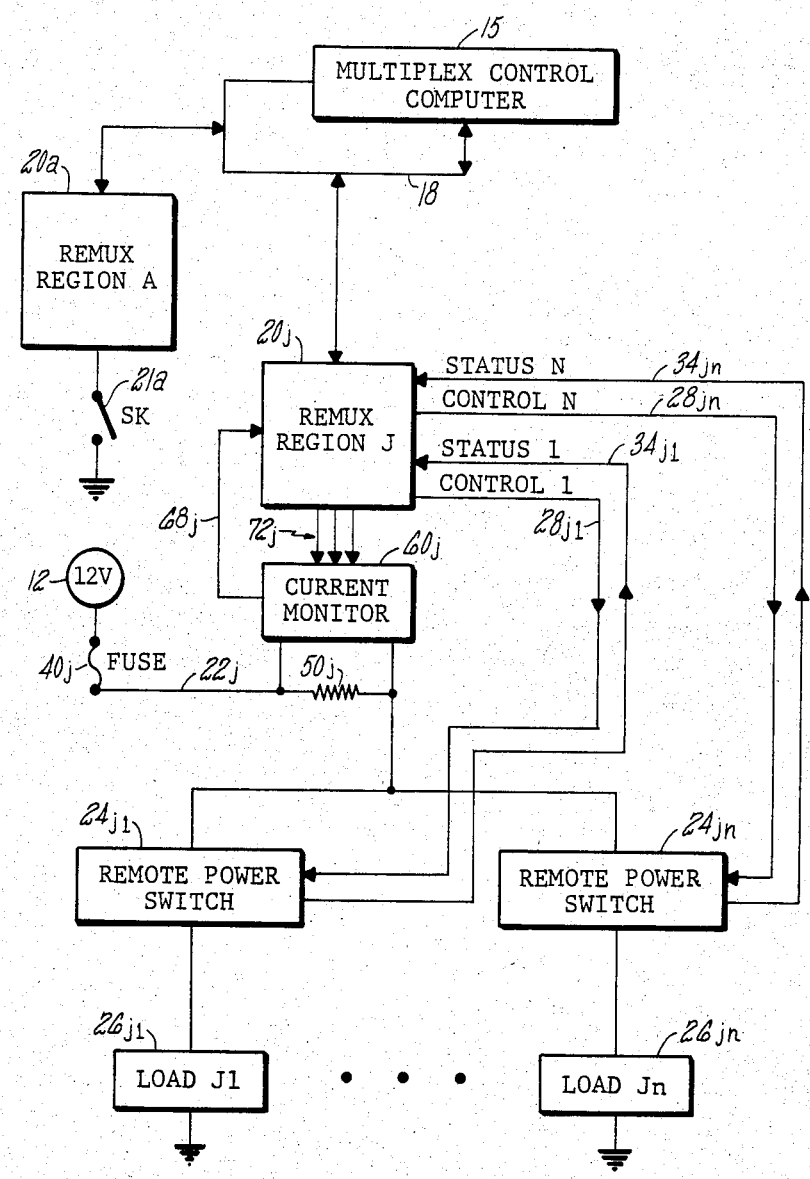
FIG. 2 is a more detailed diagrammatic illustration of a portion of the system of FIG. 1 illustrating the system for current management to the loads in that region in greater detail.

Referring to FIG. 2 in which one of the regions, "j", is depicted in greater detail, it will be seen that a plurality of generally diverse loads $26_{j1}$ ... $26_{jn}$ receive their energizing electrical power from conductor wire $22_j$ via respective power switches $24_{j1}$ ... $24_{jn}$. The conducting state of a respective power switch $24_{j1}$ ... $24_{jn}$ is determined by an enabling control signal appearing on respective lead $28_{j1}$ ... $28_{jn}$ provided at a respective output from the REMUX $20_j$. A representative input switch $21_a$ is here illustrated as being associated with REMUX $20_a$ for providing a command to one of the loads $26_{j1}$ ... $26_{jn}$ in the "j" region. The input switch 21 might instead have been located in the "j" region, and might serve to command the turn-on or turn-off of a "j" function, such as a mirror heater or the like.

Figure 3:
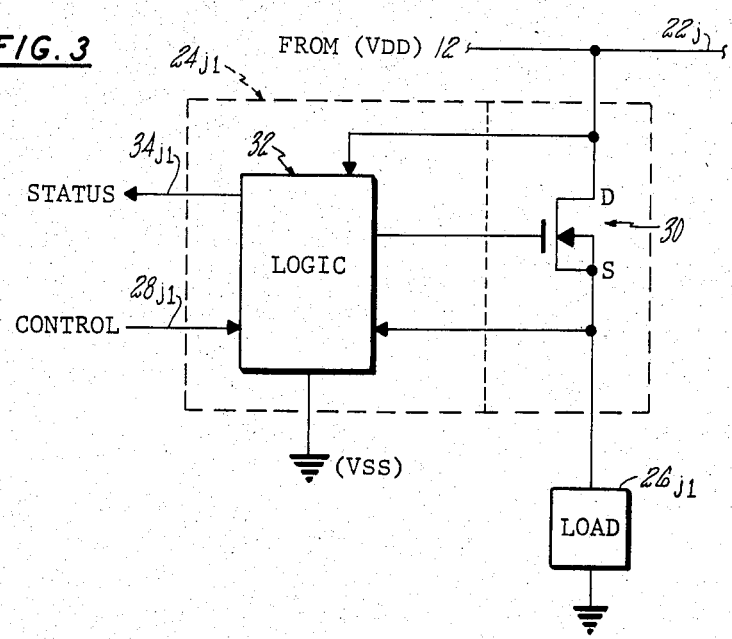
FIG. 3 is a generalized diagrammatic illustration of one of the power switches depicted in FIGS. 1 and 2.

In accordance with the invention and referring to FIG. 3, a representative power switch $24_{j1}$ comprises a solid state power switch such as power MOSFET 30 and associated logic 32. The power MOSFET 30 is capable of conducting 10 amperes of current with a maximum voltage drop of 0.5 volts when in the "on" condition. In the "off" condition, the MOSFET 30 can withstand 60 volts applied to its terminals with very low "leakage" current. The associated logic 32 typically uses low-power CMOS technology. The logic 32 responds to an enabling control signal on lead $28_{j1}$ from the REMUX $20_j$ to normally turn on or turn off power FET 30, thereby normally providing or preventing conduction of an energizing electrical current to the load $26_{j1}$ from the supply 12 via power conductor $22_j$. The logic 32 may also provide for short circuit detection, over load detection, over voltage detection and/or thermal sensing so as to protect the power FET 30 in one of those abnormal conditions. Logic 32 also includes provision for recognizing such an abnormal condition and communicating it to the REMUX $20_j$ in the form of a STATUS BIT appearing on line $34_{j1}$. The multiplex control computer can access this information via REMUX $20_j$ for ongoing diagnostic purposes. Assuming the power MOSFET 30 is connected in the so-called "high-side" configuration illustrated in FIGS. 2 and 3 in which its drain is connected to the relatively higher potential of the 12 volt power source 12, the circuitry of power switch $24_{j1}$ will also include a charge pump for applying a potential to the gate greater than that of the 12 volt supply voltage.

Returning to a consideration of the invention as depicted in FIG. 2, all of the electrical current required to power the several loads $26_{j1}$ ... $26_{jn}$ is provided via a single wire conductor $22_j$. A fuse $40_j$ is illustrated as being connected in series with the power conductor $22_j$ to protect that conductor and the circuitry and loads downstream thereof in the event of relatively large current excursions. However, it is generally desirable to size the power conductor wire $22_j$ as small as possible to minimize its weight, volume and cost in such automotive vehicle applications. Because the several loads $26_{j1}$ ... $26_{jn}$ in a particular region "j" may not normally be simultaneously energized, it is possible in accordance with the invention to reduce the size or gauge of the conductor wire $22_j$ below that which would otherwise be required to accommodate the simultaneous steady-state current drain of all of the loads $26_{j1} \ldots 26_{jn}$. Moreover, in those instances in which the normal demands for energization of loads at a particular region would exceed the steady-state current-carrying capacity of the conductor $22_j$, provision has been made for temporarily preventing or delaying energization of selected ones of the loads until the current demands of other ones of the loads have been satisfied and are terminated. Characteristically, this function may be provided by assigning certain priorities to the various loads, dependent upon their respective functions. For example, a command to energize a window motor may be accorded a greater priority than one to energize a heater element or a non-essential indicator lamp during the relatively brief interval of several seconds required for window actuation. While it might be possible to profile the anticipated current drains of each of the loads with sufficient accuracy and detail as to attain the desired current management solely through the programming of the multiplex computer 15 without actually determining the magnitude of the current in conductor $22_j$, a more reliable arrangement involves the actual monitoring of that current.

A current sensing or monitoring arrangement is provided by placing a resistive element $50_j$, such as a resistance wire or the like, in series with power conductor $22_j$ between power supply 12 and the several power switches $24_{j1} \ldots 24_{jn}$. Appropriate current monitoring circuitry $60_j$ is connected across the resistor $50_j$ to sense the magnitude of the current flowing in conductor $22_j$. The output of current monitor $60_j$ is a signal indicative of whether the magnitude of the current in conductor $22_j$ is above or below some predetermined threshold. That current threshold is typically below the rated current capacity of the selected wire $22_j$. In one example, the rated capacity of wire $22_j$ may be 20 amperes and the threshold may be 15 amperes. The output signal from current monitor $60_j$ is extended via lead $68_j$ to an appropriate input to REMUX $20_j$ for relay to the multiplex control computer 15. The program of computer 15 is structured to disregard temporary over-current conditions caused by in-rush currents during start-up operation of a load. Typically such intervals are less than 320 milliseconds. Thereafter, if an over-current condition remains, the program is operative to disable or inhibit the enabling signal extended to the power switches $24_j$ associated with one or more of the lower priority loads $26_j$. The system periodically monitors the current level signal appearing on line $62_j$ and following its return to a normal condition below the threshold, the previously-applied command for energization of the temporarily disconnected load is reapplied to reenergize that load. If multiple commands for energization have been temporarily inhibited, the loads are enabled based on a predetermined priority schedule.

Figure 4:
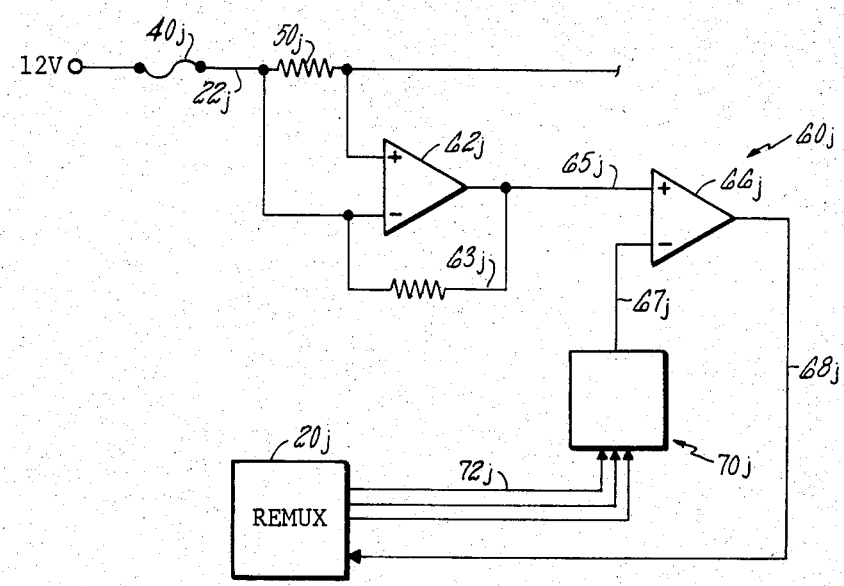
FIG. 4 is a generalized diagrammatic illustration of a current monitor depicted in FIG. 2.

FIG. 4 is a diagrammatic circuit view of current monitor $60_j$. Power is supplied from a 12 volt source through fuse $40_j$ through wire $22_j$ to the appropriate loads. Resistor $50_j$ is a section of resistance wire located within the wire $22_j$ such that a predetermined resistance is achieved. The voltage drop across this resistor is measured to indicate the current flow to the loads through power conductor $22_j$. First stage operational amplifier $62_j$ is connected to wire $22_j$ on both sides of the resistive portion $50_j$. Operational amplifier $62_j$ generates an output which is conducted through wire $65_j$ to the positive input of a second operational amplifer $66_j$ which operates as a comparator. A feedback loop $63_j$ is provided about first stage operational amplifier $62_j$. The output from comparator $66_j$ is either zero or 5 volts to give an effective digital signal, depending on whether the voltage on lead $65_j$ from amplifier $62_j$ is above or below a current threshold established by the potential applied to the negative input of the comparator via lead $67_j$. In a basic embodiment, the threshold may be a fixed value. This digital signal is conducted via wire $68_j$ to REMUX $20_j$ which determines from that signal whether or not the threshold level of the current flowing through wire $22_j$ has been exceeded.

Additionally shown in FIG. 4, is a programmable or adjustable threshold $70_j$. Programmable threshold $70_j$ is located to supply a threshold signal to comparator $66_j$ to determine the current threshold above which a logic 1 appears on line $68_j$. A series of connections $72_j$ are provided between REMUX $20_j$ and programmable threshold $70_j$ such that a three-bit signal may be provided from the regional muxtiplex computer REMUX $20_j$ to the programmable threshold to vary the threshold level applied to comparator $66_j$ on line $67_j$.

By utilizing programmable threshold $70_j$, additional features may also be achieved with the herein-described circuit. The various loads each have an associated current profile and the operation of a combination of the loads results in a combination profile achieved by adding the various profiles of each load.

The central multiplex computer knows which loads are being energized and can look up in a table the respective load profile for each load. Additionally, the central multiplex computer can provide an appropriate signal to the appropriate regional REMUX to indicate what that load profile should be. The REMUX can then provide a signal over wires $72_j$ to programmable threshold $70_j$ to adjust the threshold voltage applied to the comparator $66_j$ such that the current threshold level detected on power conductor $22_j$ is adjusted to be the threshold level corresponding to the load profile for the specific loads being energized. Hence, the threshold level may be adjusted based on the profile of the loads being energized and an over-current situation may be detected at less than the threshold level based on the current-carrying capacity of the wire.

The use of programmable threshold $70_j$ also provides the capability of providing diagnostics within the multiplex circuit. The multiplex control computer can be programmed to sequentially energize each load in a region through the appropriate REMUX. The central multiplex computer also can look up in a table the load profile for the appropriate load being energized and can provide appropriate signals such that the programmable threshold can be adjusted to detect a threshold level based upon the load profile for that specific load. A comparison of the two can then be utilized to determine whether or not the load is performing as designed. The fact that no current is flowing is utilized to indicate an open circuit. High current can either indicate a failure in the load or a short circuit occurring at some location. Other specific variations from the load profile can additionally be evaluated.

It is contemplated that the central multiplex computer will include appropriate logic for achieving the desired functions. It is anticipated that an overall cycle time of 1.44 seconds could be utilized having a 320 millisecond start-up period during which functions will be allowed to be enabled until an over-current condition exists, and it will not be utilized to disable any other function. Two additional time periods each being 560 milliseconds in length are thereafter utilized. The functions are appropriately enabled and disabled at 80 millisecond increments within each of these cycles. If a specific load is indicated to be disabled due to an over-current situation for multiple time increments, as for instance following a second indication of over-current after the first such indication at the end of the 320 millisecond interval, it is then disabled for the entire remaining length of the 560 millisecond interval.

The basic premise of the logic is that, within an overall cycle, if an over-current condition occurs, functions will be disabled until the over-current condition is cleared. Once an over-current condition is cleared, the functions are then reenabled. However, if two successive over-current situations are sensed, a corresponding bypass is arranged. The bypass arrangement will then function to disable but not reenable during the 560 millisecond interval. This allows the lower priority function to be enabled even though a high priority function is disabled if the higher priority function repeatedly caused an over-current condition when reenabled with the lower priority function disabled. The functions are enabled and disabled in order of priority such that they are enabled from highest to lowest priority and disabled from lowest to highest priority. This is accomplished by prioritizing all the functions in a specific region in a table and by logically proceeding in a specific order through the table to either enable or disable the functions. The current management function ends when all functions are enabled and the over-current condition is not present at the end of a cycle time period. By "enabling" all the functions is simply meant they are permitted to occur, not that they are necessarily energized.

Although no flow chart is given herein, it is to be understood that a specific subroutine in the multiplex computer is utilized. the subroutine in a normal manner sets all initial conditions to zero and may thereafter at 80 millisecond intervals check for an over-current situation. Various flags are set to indicate the appropriate conditions of different portion of the circuit. A current management flag is set to indicate that the logic is in a current management condition. On each occasion of the 80 millisecond period elapsing and a current management flag being set, the current condition will be checked and a function enabled or disabled as required. Additional flags are set which determine the first 320 milliseconds of the cycle which elapse without further disabling functions and to indicate which of the second two 560 millisecond time periods the logic is in.

Once the logic is in the over-current sensing mode the logical question of whether or not the current-sensing bit is energized is asked. This is a bit in the REMUX for each region which is set in response to the signal generated by the current monitor. If this bit is not set, the logic can flow to the enable function subroutine which acts to enable additional functions as long as the over-current condition is not achieved. If the current-sensing bit is energized, then the logic flows to a diable function subroutine which acts to sequentially disable functions until the over-current condition is cleared. Appropriate subroutines are provided for looking up on an appropriate map or table the various functions and determining their priority such that they may be enabled and disenabled in their appropriate order. The specific programming to accomplish these referenced functions is within the skill in the art.

Although the invention has been described in relation to a particular embodiment it is to be understood by those skilled in the art that variations and modifications can be made within the spirit and scope of the invention.

We claim:

1. An electrical power delivery system for a vehicle comprising:
    power conducting means for delivering power to a plurality of loads in a region of said vehicle, said power conducting means having a fixed capacity to carry current which capacity is less than the current required to simultaneously operate all of said loads;
    power switch means connecting the power conducting means to each of said loads, said power switch means including control means for selectively energizing the appropriate loads in response to selected input signals; and
    logic means operatively connected to the control means to circumvent the input signals to selectively energize the power switch means to prevent the current flow through the power conducting means from exceeding the capacity of the power conducting means.

2. The apparatus as set forth in claim 1 wherein the power conducting means is a single electrical conductor of a predetermined size.

3. The apparatus as set forth in claim 2 and further comprising:
    input means for selectively generating input signals; and
    wherein said logic means includes means for receiving said input signals and for selectively energizing the power switch means in response thereto.

4. The apparatus as set forth in claim 1 and further comprising:
    current monitoring means for monitoring the current flow through the power conducting means and generating a current signal indicative thereof; and
    said logic means being connected to receive said current signal and to selectively energize or deenergize the power switch means in response thereto to prevent the current flow through the power conducting means from exceeding the capacity of the power conducting means.

5. The apparatus as set forth in claim 4 wherein said logic means further comprises prioritizing means for selecting which loads not to energize based on the current signal received.

6. The apparatus as set forth in claim 4 wherein said logic means further comprises:
    delay means for preventing the power switch means from being deenergized unless the current signal indicates an excessive current for a predetermined delay period.

7. The apparatus as set forth in claim 1 and further comprising:
    current monitoring means for generating a current signal indicative of whether the current in the power conducting means exceeds a threshold level;
    means connected to the current monitoring means for adjusting said threshold level; and
    wherein said logic means includes means for receiving the current signal and means for supplying a signal to the threshold adjustment means to set the threshold level.

8. The apparatus as set forth in claim 7 wherein the logic means further includes:

diagnostic testing means which sequentially energizes each load through the control means, sequentially supplies a signal to the threshold adjustment means indicative of the current profile of each load and evaluates the current signal to provide a diagnostic output pertaining to the load being tested.

9. An electrical power delivery system for a vehicle comprising:

power conducting means for delivering power to a plurality of loads in a region of said vehicle, said power conducting means being of predetermined limited current-carrying capacity less than that required to deliver full current to all of said plurality of loads simultaneously;

means for generating enabling control signals;

power switch means operatively connected to respective ones of said loads of said plurality, each said power switch means being responsive to a respective enabling control signal for allowing the flow of current through said power conducting means and a respective load;

means for monitoring the current in said power conducting means to provide a signal indicating whether or not said current exceeds a threshold level; and logic circuit means operatively connected to said power switch means and to said enabling control signal generating means for selectively extending said enabling control signals to said power switch means, said logic circuit means being responsive to said signal indicating that said current exceeds said threshold for inhibiting extension of said enabling control signal to at least a preselected one of said power switch means.

10. The apparatus as set forth in claim 9 wherein the logic circuit means further comprises:

prioritizing means for selecting which enabling control signal will be extended to the power switch means in response to a predetermined priority schedule.

11. The apparatus as set forth in claim 9 wherein the power conducting means is a single wire conductor and wherein the threshold level for the current is at or less than the capacity of the wire.

12. The apparatus as set forth in claim 9 wherein the logic means further comprises:

delay means for allowing a predetermined delay interval to elapse before responding to a signal indicating that the current exceeds the threshold level.

13. The apparatus as set forth in claim 9 and further comprising:

threshold adjusting means connected to the means for monitoring the current to adjust the threshold level for the combination of loads which are receiving power.

14. A method of operating a power delivery system to selectively energize multiple loads served by a single power conductor including power switch means connecting each load to the power conductor and multiplexing means for supplying control signals to each power switch means for selectively energizing or deenergizing the loads to prevent excess current flow through the conductor which comprises the steps of:

monitoring a condition of the power delivery system;

limiting the loads which may be simultaneously operated based on the condition of the power delivery system monitored;

prioritizing the loads to be energized and deenergized such that the loads are normally energized or deenergized in a predetermined order; and determining that successive energizations of a relatively higher priority load continue to cause an excessive current flow and then bypassing said relatively higher priority load in favor of a relatively lower priority load for energization.

15. The method as set forth in claim 14 wherein the step of monitoring further comprises:

sensing the current flow through the conductor; and wherein the step of limiting includes selectively energizing or deenergizing the power switch means to regulate the current flow through the conductor.

16. The method as set forth in claim 14 wherein said steps of determining said excess current flow and of bypassing a said relatively higher priority load occur cyclically.

17. The method as set forth in claim 15 wherein the step of sensing further comprises:

determining if the current flow exceeds a threshold level; and setting the threshold level based on the combined current profile of the loads to be energized.

18. A method of testing the electrical operating characteristics of a plurality of loads connected by a single power conductor to a power source and controlled through a multiplex control computer which comprises the steps of:

sequentially energizing the loads to be tested;

monitoring the current flowing through the conductor to each load during the period it is energized;

setting the threshold level for each load based on a predetermined current profile for that load; and generating a signal indicative of the current being monitored exceeding a threshold level to indicate a condition of the load.

19. A method of operating a power delivery system to selectively energize multiple loads served by a single power conductor including power switch means connecting each load to the power conductor and multiplexing means for supplying control signals to each power switch means for selectively energizing or deenergizing the loads to prevent excess current flow through the conductor, each said load having a predetermined associated current profile, the method comprising the steps of:

monitoring a condition of the power delivery system including sensing the current flow through the conductor;

automatically setting a threshold level based on the combined predetermined current profiles of the loads to be energized;

determining if the current flow exceeds said threshold level; and limiting the loads which may be simultaneously operated based on the condition of the power delivery system monitored, including selectively energizing or deenergizing the power switch means to regulate the current flow through the conductors.

* * * * *